May 25, 1937.  R. H. LOCKYER  2,081,337
COMBINATION FLOWERPOT
Filed April 25, 1936
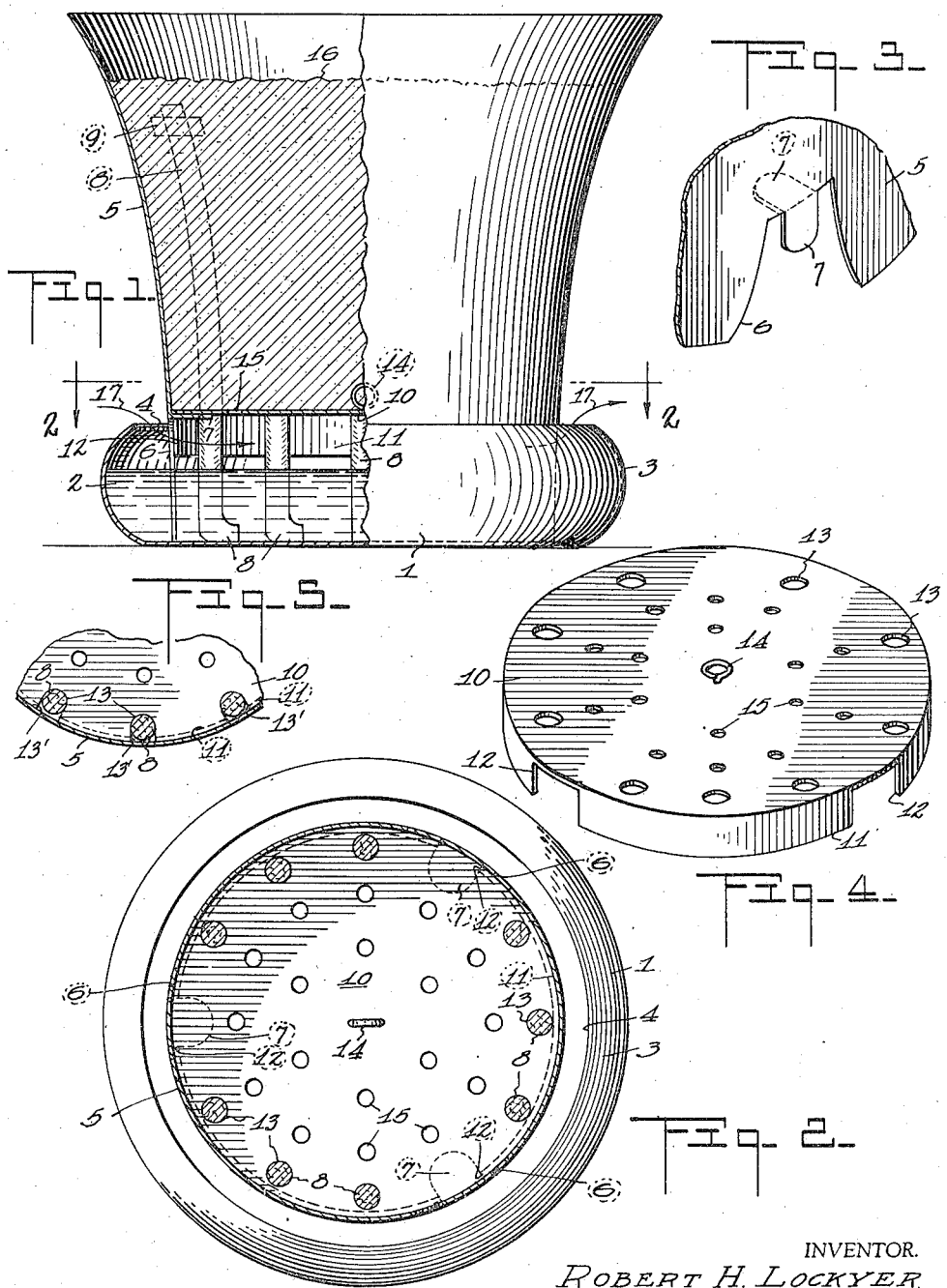
INVENTOR.
ROBERT H. LOCKYER
BY Munn, Anderson & Liddy
ATTORNEYS.

Patented May 25, 1937

2,081,337

UNITED STATES PATENT OFFICE 2,081,337

COMBINATION FLOWERPOT

Robert H. Lockyer, San Francisco, Calif.

Application April 25, 1936, Serial No. 76,411

8 Claims. (Cl. 47—38)

My invention relates to improvements in combination flower pots, and it consists of the combinations, constructions and arrangements hereinafter described and claimed.

An object of my invention is to provide an improvement over the form of the invention shown in my co-pending application, Serial No. 54,603, filed December 16, 1935. In the pending application I show a wick passing up along the outer surface of the flower pot, and then extending down into the interior of the pot a slight distance below the earth line.

In the improved form of my invention I dispose the wicks along the inner surface of the flower pot or container, and these wicks extend throughout the greater distance of the earth, and then pass through openings in the bottom and have their lower ends immersed in water. I have found that a wick made of asbestos will not deteriorate in the earth, and will act to draw the water from the base by capillary attraction. Since the wicks are made from asbestos a greater portion of the wicks can be surrounded by earth, and this permits the wicks to be placed on the inside of the container or pot rather than on the outside.

The flower pot is provided with a removable bottom and this bottom has a flanged periphery provided with openings for receiving lugs that are struck inwardly from the side of the container. The bottom is also provided with slots in the flange and in the portion of the bottom disposed adjacent to the flange for receiving the wicks. This permits the bottom to be disposed in place after the wicks are attached to the inner surface of the container.

The bottom is spaced above the water level in the base and the container wall is provided with openings adjacent to the inwardly extending lugs for permitting air to pass between the bottom and the surface of the liquid in the base. This will keep the device from becoming waterlogged at the lower portion of the earth and rotting the plant roots, which is often the case in a standard flower pot.

The device is extremely simple in construction and may be manufactured at slight expense. The container may be formed in various shapes and so likewise can the base. In this way the appearance of the flower pot is enhanced.

Other objects and advantages will appear in the following specification, and the novel features of the device will be particularly pointed out in the appended claims.

My invention is illustrated in the accompanying drawing forming a part of this application, in which Figure 1 is a side elevation of the device partly broken away to show the internal construction;

Figure 2 is a section along the line 2—2 of Figure 1;

Figure 3 is a perspective view of a portion of the container;

Figure 4 is an isometric view of the removable bottom; and

Figure 5 is a section through a modified form of the device.

In carrying out my invention I provide a base indicated generally at 1. This base is hollow and is designed to hold water indicated at 2. In Figure 1 I show the base formed of sheet metal with a curved edge 3 and an open top 4. It is obvious that the base may be made of any material desired so long as it is provided with a depression in its upper surface for holding water. The shape of the base also may be changed in any manner.

I also provide a container indicated generally at 5, and in Figure 1 this container is shown as being made of metal, and the side wall of the container is flared outwardly, in order to resemble a flower pot. The diameter of the lower end of the container is smaller than the diameter of the opening 4, and this permits the container to be placed within the base 1 and to rest upon the bottom of the base. The container may be made out of any material desired, and also the shape may be varied. It is possible to make the base and the container out of metal, and then to cover this metal by enamel of any color desired. Striking effects can be produced in this manner.

The lower end of the container is cut away at 6, see Figure 3. Three or more cut-away portions can be provided in the wall of the container 5 and the drawing illustrates the wall being provided with three cut-away portions or recesses 6. Figure 3 also shows a lug 7 extending downwardly in the recess 6. Three of these lugs are provided in the container and they are bent inwardly as shown by the dotted line position in Figure 3. In Figure 1 it will be seen that the lugs 7 are disposed above the top of the base 1 when the lugs are bent inwardly.

In Figure 2 it will be noted that a plurality of wicks 8 extend up along the inner surface of the container 5 and these wicks may be secured to the surface by adhesive or by clips 9 shown in Figure 1. The wicks are long enough to extend down into the water 2, and these wicks will become saturated from the water by capillary attraction. As already stated the wicks are made of asbestos, and I have found that this material will not deteriorate when imbedded in earth for indefinite periods of time. This will cause the wicks to last throughout the life of the flower pot. The wicks may be of any shape desired, and although I have shown them round in cross section in the drawing, it is obvious that they may be made flat, or any other shape.

In Figure 4 I show a removable bottom 10 provided with a flanged rim 11. This rim has slots 12 for receiving the lugs 7. Openings 13 are also formed in the bottom and close to the edge of the bottom for receiving the wicks 8. The bottom in being inserted is disposed in a position where the slots 12 will be aligned with the lugs 7. The bottom may now be lowered into its correct position and will be supported by the lugs 7. In order to aid in moving the bottom into a position within the container and for removing the bottom from the container if necessary, I provide an eyelet 14 that is secured to the center of the bottom 10, see Figure 4. It is obvious that a portion of the bottom may be struck up and act as a hand grip without departing from the scope of the invention. Figure 4 also shows the bottom provided with a number of small openings 15 to permit water to drain from the earth and drop into the base 1. In Figure 1 I show the container 5 filled with earth indicated at 16, and the top of the earth covers the wicks 8.

From the foregoing description of the various parts of the device, the operation thereof may be readily understood.

The device is assembled in the manner shown in Figure 1, and any plant desired may be disposed in the earth 16. In watering the earth the water either can be poured into the top of the container 5 or it can be poured into the base 1 by means of the opening 4. If the plant is watered from the top of the container 5, this water will seep through the earth 16, and the excess water will pass through the openings 15, and will find its way into the base 1. The wicks 8 will continuously feed sufficient water to the earth to properly nourish the plant. It is obvious that any number of wicks may be provided and the size of these wicks can be altered to adapt the device to provide sufficient water to different types of plants. If water is added through the opening 4 it will be conveyed to the earth 16 by the wicks 8.

Although the device holds a body of water at all times, this water will not water-log the plant roots and cause them to rot. In fact, an air space is provided between the bottom 10 and the water 2, and air can flow through this space as indicated by the arrows 17 in Figure 1. The air enters the opening 4 and passes through the recesses 6 and then flows beneath the bottom 10. In this way the earth 16 situated near the bottom of the flower pot will not be contaminated with too much water.

Although I have shown the container 5 as being removably disposed in the base 1 it is obvious that the container may be spot-welded or otherwise secured to the base if desired. This device does not need a screen to hide the outer surface of the container 5 because the wicks pass up along the inner surface of the container instead of along the outer surface as shown in my co-pending application. So far as I am aware, asbestos wicks have not been used for feeding water to a flower pot, and it is this feature that permits the wicks to be placed on the inside of the pot.

In the bottom 10 shown in Figure 4 it is necessary to thread the wicks through the openings 13, and this makes it difficult to insert the bottom 10 from the top of the flower pot. In Figure 5 I show a slightly modified form of the device in which the wick openings 13 communicate with slots 13' formed in the rim 11. This construction permits the bottom 10 to be inserted from the top of the container, and the slots 13' are aligned with the wicks at the time the recesses 12 are aligned with the lugs 7. The bottom 10 may now be lowered and will cause the wicks 8 to be received in the slots 13' and openings 13. In all other respects this form of the device is identical to that form shown in Figures 1 to 4 inclusive, and therefore further description need not be given.

While I have shown only the preferred forms of my invention, it should be understood that various changes or modifications may be made within the scope of the appended claims without departing from the spirit of the invention.

I claim:

1. A flower pot comprising a base for holding water, a container removably disposed in the base, a bottom having a diameter equal to the diameter of the lower end of the container, and being removably disposed in the container, means carried by the container wall for supporting the bottom above the water level in the base, and a plurality of wicks projecting through the bottom adjacent to the periphery thereof and extending along the inner surface of the container wall, the lower ends of the wicks being immersed in the water.

2. A flower pot comprising a hollow base for holding water, a container for earth disposed within the base, a bottom for the container disposed above the water line in the base, said bottom having a diameter equal to the diameter of the lower end of the container, said container having openings for permitting air to circulate through the openings and between the bottom and the water, and a plurality of wicks extending from the water and through the bottom, said wicks being disposed adjacent to the periphery of the bottom, and extending along the inner surface of the container.

3. A flower pot comprising a base for holding water, a container for earth having a perforated bottom disposed above the water line, and asbestos wicks extending along the inner surface of the container and passing through certain of the perforations, the lower ends of the wicks being immersed in the water, whereby water will be conveyed to the earth by capillary attraction as needed.

4. In combination, a base for holding water, a container mounted in the base, a bottom removably mounted in the container and having recesses extending in from its edges, wicks secured to the inner surface of the container and being received in the recesses when the bottom is disposed in position, and means for supporting the bottom above the level of the water line in the base.

5. In combination, a base for holding water, a container mounted in the base, a bottom removably mounted in the container and having recesses extending in from its edges, wicks secured to the inner surface of the container and being received in the recesses when the bottom is disposed in position, and means for supporting the bottom above the level of the water line in the base, and a handle extending upwardly from the bottom for aiding in placing the bottom in and for removing it from the container.

6. In combination, a base for holding water, a container having recesses in its lower portion, the tops of the recesses being positioned above the water line, inwardly extending lugs integral with the container and being on a level with the tops of the recesses, a bottom supported by the lugs, and asbestos wicks extending along the inner surface of the container and projecting through the bottom and into the water for conveying water from the base to earth disposed in the container.

7. A flower pot comprising a hollow base for holding water, a container mounted therein and having inwardly extending lugs mounted above the water line, a removable bottom provided with a flange having recesses for receiving the lugs, said container having openings below the lugs for permitting air to pass between the bottom and the water, wicks carried by the inner surface of the container and projecting through the bottom and extending into the water.

8. A flower pot comprising a hollow base for holding water, a container mounted therein and having inwardly extending lugs mounted above the water line, a removable bottom provided with a flange having recesses for receiving the lugs, said container having openings below the lugs for permitting air to pass between the bottom and the water, wicks carried by the inner surface of the container and projecting through the bottom and extending into the water, and a handle extending upwardly from the bottom for aiding in placing the bottom in and for removing it from the container.

ROBERT H. LOCKYER.